United States Patent
Higuchi (10) Patent No.: US 9,638,532 B2
(45) Date of Patent: May 2, 2017

(54) VEHICLE DRIVE ASSIST SYSTEM, AND DRIVE ASSIST IMPLEMENTATION METHOD

(71) Applicant: DENSO CORPORATION, Kariya, Aichi-pref. (JP)

(72) Inventor: Yuya Higuchi, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/767,502

(22) PCT Filed: Jan. 10, 2014

(86) PCT No.: PCT/JP2014/000074
§ 371 (c)(1),
(2) Date: Aug. 12, 2015

(87) PCT Pub. No.: WO2014/125757
PCT Pub. Date: Aug. 21, 2014

(65) Prior Publication Data
US 2016/0003630 A1    Jan. 7, 2016

(30) Foreign Application Priority Data
Feb. 14, 2013   (JP) .................................. 2013-026541

(51) Int. Cl.
*G01C 21/30* (2006.01)
*B62D 15/02* (2006.01)
(Continued)

(52) U.S. Cl.
CPC ............. *G01C 21/30* (2013.01); *B60W 10/04* (2013.01); *B60W 10/18* (2013.01); *B60W 10/20* (2013.01);
(Continued)

(58) Field of Classification Search
CPC .......... G08G 1/056; G08G 1/16; G08G 1/167; G01C 21/26; G01C 21/30; B60W 10/04; B60W 10/18; B60W 10/20; B62D 15/025
(Continued)

(56) References Cited

U.S. PATENT DOCUMENTS 8,838,323 B2 *  9/2014  Matsunaga ........... B60W 30/10
                                                          701/28
9,238,483 B2 *  1/2016  Hafner .................... B62D 13/06
(Continued)

FOREIGN PATENT DOCUMENTS

JP    2002340590 A   11/2002
JP    2005173909 A    6/2005
(Continued)

OTHER PUBLICATIONS

International Search Report and Written Opinion (in Japanese with English Translation) for PCT/JP2014/000074, mailed Feb. 4, 2014; ISA/JP.

*Primary Examiner* — Atul Trivedi
(74) *Attorney, Agent, or Firm* — Harness, Dickey & Pierce, P.L.C.

(57) ABSTRACT

A vehicle drive assist system includes: a position detection device that detects a position of a vehicle; a map data acquisition device that acquires map data; a map matching device that determines the position of the vehicle on a road based on a detected position and the map data; an assist device that assists a driver's operation based on a determined position of the vehicle and a road shape ahead of the vehicle in a traveling direction indicated on the map data; a determination device that determines a possibility that the vehicle travels a wrong way on a road where the traveling direction is fixed to one way; and a cancel device that cancels drive assist when a possibility of reverse run exists.

9 Claims, 5 Drawing Sheets

(51) Int. Cl.
  *G08G 1/056* (2006.01)
  *G08G 1/16* (2006.01)
  *B60W 10/04* (2006.01)
  *B60W 10/18* (2012.01)
  *B60W 10/20* (2006.01)

(52) U.S. Cl.
  CPC ........... B62D 15/025 (2013.01); G08G 1/056 (2013.01); G08G 1/16 (2013.01); G08G 1/167 (2013.01)

(58) Field of Classification Search
  USPC ................................................... 701/41, 450
  See application file for complete search history.

(56) References Cited

U.S. PATENT DOCUMENTS

| | | | | |
|---|---|---|---|---|
| 2002/0105423 | A1* | 8/2002 | Rast | G08G 1/162 340/479 |
| 2004/0104842 | A1* | 6/2004 | Drury | G01C 21/34 342/357.31 |
| 2005/0071061 | A1* | 3/2005 | Kato | B60T 8/172 701/41 |
| 2005/0143889 | A1* | 6/2005 | Isaji | G08G 1/161 701/70 |
| 2006/0287826 | A1* | 12/2006 | Shimizu | B60K 35/00 701/431 |
| 2007/0250263 | A1 | 10/2007 | Yamada | |
| 2009/0319126 | A1* | 12/2009 | Miyajima | B60K 31/0066 701/41 |
| 2010/0106374 | A1* | 4/2010 | Miyajima | B60T 8/1755 701/41 |
| 2010/0198456 | A1* | 8/2010 | Komori | B60W 40/09 701/33.4 |
| 2010/0209891 | A1* | 8/2010 | Lin | G09B 19/167 434/66 |
| 2010/0292895 | A1* | 11/2010 | Nakamura | G08G 1/09623 701/41 |
| 2014/0222288 | A1* | 8/2014 | Lavoie | G06F 17/00 701/41 |
| 2014/0240114 | A1* | 8/2014 | Waeller | B60Q 9/008 340/435 |
| 2015/0046038 | A1* | 2/2015 | Kawamata | B60W 30/09 701/41 |
| 2015/0344032 | A1* | 12/2015 | Oh | B60W 30/16 701/37 |
| 2016/0003630 | A1* | 1/2016 | Higuchi | G08G 1/056 701/41 |

FOREIGN PATENT DOCUMENTS

| | | |
|---|---|---|
| JP | 2007015558 A | 1/2007 |
| JP | 2007140883 A | 6/2007 |
| JP | 2007290505 A | 11/2007 |
| JP | 2009210510 A | 9/2009 |
| JP | 2011095929 A | 5/2011 |
| JP | 2012058948 A | 3/2012 |
| JP | 2012189343 A | 10/2012 |

* cited by examiner

VEHICLE DRIVE ASSIST SYSTEM, AND DRIVE ASSIST IMPLEMENTATION METHOD

CROSS REFERENCE TO RELATED APPLICATIONS

This application is a U.S. National Phase Application under 35 U.S.C. 371 of International Application No. PCT/JP2014/000074 filed on Jan. 10, 2014 and published in Japanese as WO 2014/125757 A1 on Aug. 21, 2014. This application is based on and claims the benefit of priority from Japanese Patent Application No. 2013-026541 filed on Feb. 14, 2013. The entire disclosures of all of the above applications are incorporated herein by reference.

TECHNICAL FIELD

The present disclosure relates to a vehicle drive assist system, having an assist device to assist a driver's operation based on position of own vehicle determined by map matching processing and map data, and a drive assist implementation method.

BACKGROUND ART

In recent years, in the field of motor vehicles, a drive assist system to support (assist) a driver's operation by performing vehicle control in correspondence with behavior and surrounding environment of the vehicle, is put into practical use. Among these systems, a map-based ADAS (Advanced Driver Assistance Systems) to perform vehicle control such as control of accelerator, a brake, or steering, based on map information is known. As an actual example of the map-based ADAS, a function referred to as an "intelligent pedal" is known. This function is to look ahead a road map shape ahead of the vehicle in a traveling direction of the vehicle, to predict a curve approaching the vehicle, and push back an accelerator pedal when the speed is excessive, so as to call the driver's attention.

To realize this map-based ADAS, a map matching technology is indispensable. That is, to look ahead road map shape ahead of the vehicle, it is necessary to accurately detect (determine) the position of the vehicle on the road map by map matching processing. The map-based ADAS is actuated on the assumption that the map matching processing is properly performed. As a technique related to the map matching processing, a technique described in Patent Literature 1 is known.

PRIOR ART LITERATURES

Patent Literature

Patent Literature 1: JP 2002-340590 A

SUMMARY OF INVENTION

It is an object of the present disclosure to provide a vehicle drive assist system for performing drive assist based on the position of an own vehicle determined by map matching processing, capable of preventing inappropriate assist control due to reverse run of the own vehicle on a road, and a drive assist implementation method.

According to a first aspect of the present disclosure, a vehicle drive assist system includes: a position detection device that detects a position of a vehicle based on a detection signal from at least one of a plurality of vehicular sensors; a map data acquisition device that acquires map data; a map matching device that determines the position of the vehicle on a road by map matching processing based on a detected position detected by the position detection device and the map data; an assist device that assists a driver's operation based on a determined position of the vehicle determined by the map matching device and a road shape ahead of the vehicle in a traveling direction indicated on the map data; a determination device that determines a possibility that the vehicle travels a wrong way on a road where the traveling direction is fixed to one way; and a cancel device that cancels drive assist executed by the assist device when the determination device determines that a possibility of reverse run exists.

Accordingly, according to the system, drive assist is performed based on the position of the own vehicle determined by map matching processing. It is possible to prevent inappropriate assist control due to reverse run of the own vehicle on the road.

According to a second aspect of the present disclosure, a drive assist implementation method in a vehicle having an assist device that assists a driver's operation, includes: detecting a position of the vehicle based on a detection signal from at least one of a plurality of vehicular sensors; acquiring map data; determining the position of the vehicle on a road by map matching processing based on a detected position and the map data; assisting the driver's operation with the assist device based on a determined position of the vehicle and a road shape ahead of the vehicle in a traveling direction indicated on the map data; determining a possibility that the vehicle travels a wrong way on a road where the traveling direction is fixed to one way; and cancelling the drive assist executed by the assist device when it is determined that a possibility of reverse run exists.

According to the method, drive assist is performed based on the position of the own vehicle determined by map matching processing. It is possible to prevent inappropriate assist control due to reverse run of the own vehicle on the road.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

In the conventional map matching technology, matching between the position of an own vehicle and a wrong road often happens. For example, in a place where 2 parallel roads follow a narrow-angle branching point, it is difficult in principle to determine a road the own vehicle has entered. There is a high possibility of matching on a wrong road. As vehicle control using this erroneous matching result may lead to inappropriate drive assist, careful monitoring is required as to whether or not the map matching result is trustworthy.

In other words, it is required to have a function of inference as to whether or not the map matching result is correct (reliability) from own operational status. It is possible to perform appropriate drive assist by performing vehicle control (drive assist) only when the reliability is sufficiently high. Note that in the map matching processing described in the Patent Document 1, when an own vehicle mark is located on a water-related object such as a lake, the reliability of map matching is lowered (the reliability of dead reckoning position by self-contained navigation is raised). In this case, a road search range is widened.

In a vehicle, reverse run, which is reverse-way traveling on a one-way road, happens sometimes. For example, when a vehicle returns from an expressway service area to a main road, a driver may erroneously enter the entrance slip road side to the service area. Otherwise, on a road with a plurality of lanes each way, the driver may mistake the right-side lane for an opposite (counter) lane and performs U-turn traveling. In other case, the driver may overlook a no-entry road traffic sign and enter a one-way road from the road side. The map matching technology is based on the assumption that the vehicle travels in compliance with the laws and regulations. In the case of traveling incompliant with the laws and regulations such as reverse run, the operational status of the map matching itself is wrong.

However, in the map matching processing, even in a case where the vehicle actually reverse-way travels a one-way road of e.g. an expressway in a mountainous area, the travel is erroneously determined as travel in compliance with laws and regulations on an adjacent counter lane. In this case, since there is no problem in the map matching processing, the reliability of map matching by own inference is extremely high. In this manner, in a system to perform vehicle control based on the position of the own vehicle by map matching processing, it is impossible to perform appropriate drive assist when the vehicle reverse-way travels.

Figure 5A:
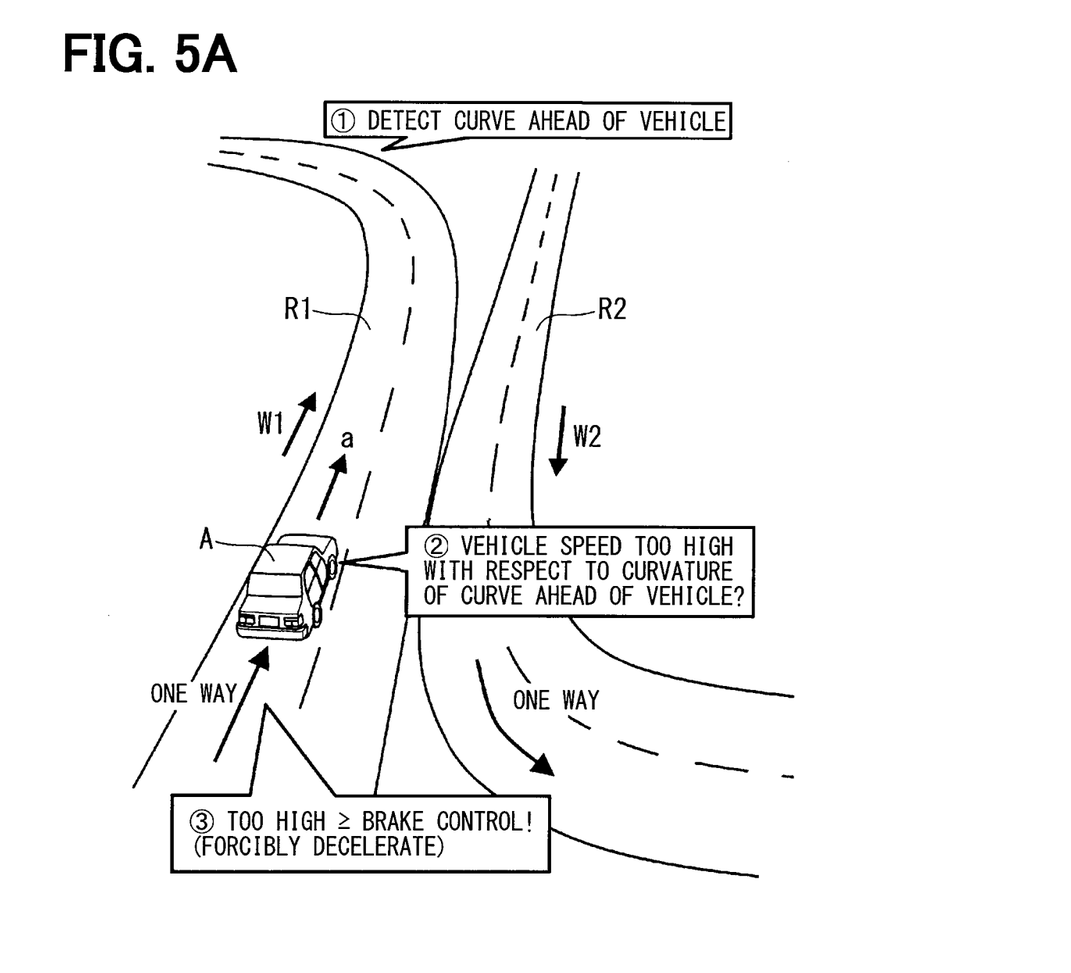
FIG. 5A is a diagram for explaining a particular example of a map-based ADAS.
Figure 5B:
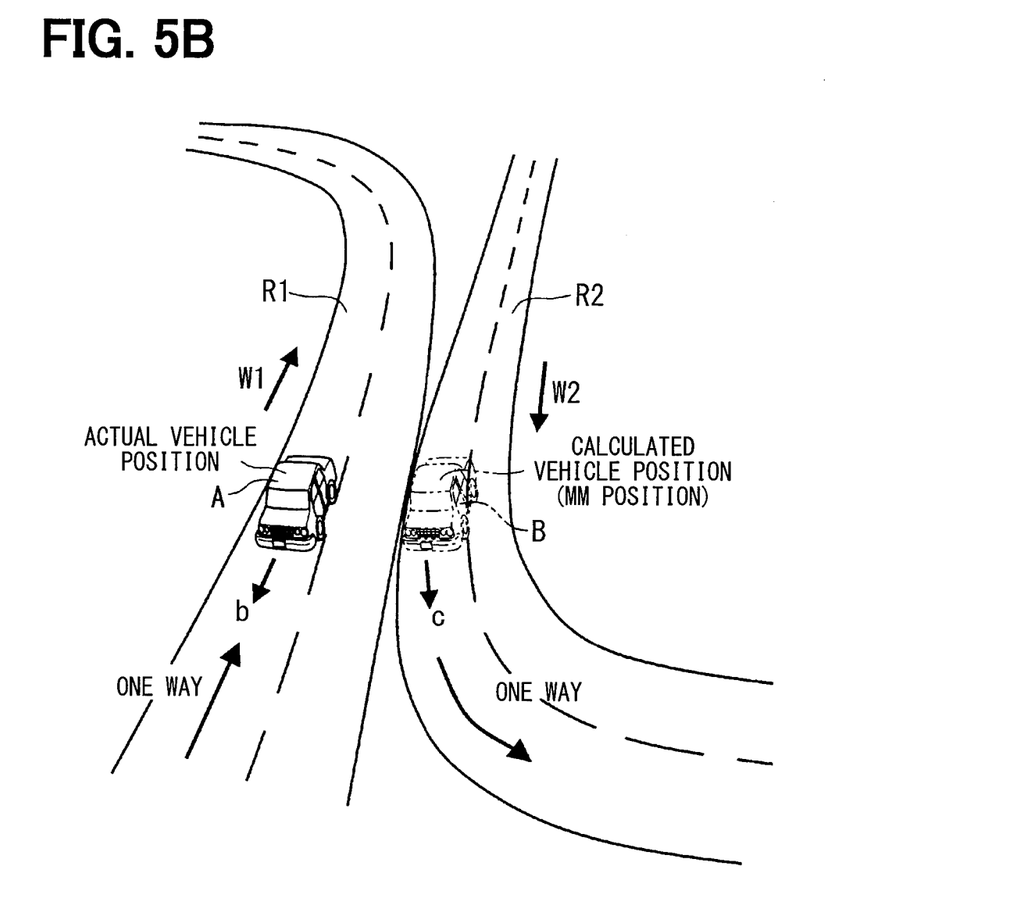
FIG. 5B is a diagram showing an example of map matching processing in the case of reverse run.

One particular example will be given. In FIGS. 5A and 5B, a one-way road R1 in an arrow W1 direction and a one-way road R2 in an opposite arrow W2 direction are adjacent to each other. As shown in FIG. 5A, in a case where a vehicle A travels in a regular arrow a direction on the road R1, when the drive assist system detects a curve of the road R1 ahead of the vehicle, it determines whether or not the current vehicle speed of the vehicle A is too high with respect to the curvature of the curve. When the system determines that the vehicle speed is too high, it performs control (assist) to forcibly decelerate the vehicle. On the other hand, as shown in FIG. 5B, in a case where the vehicle A reverse-way travels in the arrow b direction on the road R1, in the map matching processing, it is determined that a vehicle B travels in an arrow c direction, as a regular direction, on the road R2.

Accordingly, in the drive assist based on the position of an own vehicle determined by map matching processing, it is required to prevent inappropriate assist control due to reverse run of the own vehicle.

Note that the possibility of reverse run of the own vehicle in the present disclosure is a concept including, not only detection of reverse run, but a case where, although the reverse run has not been determined, there is a possibility of reverse run of the own vehicle (at least there is a doubt of reverse run).

Figure 1:
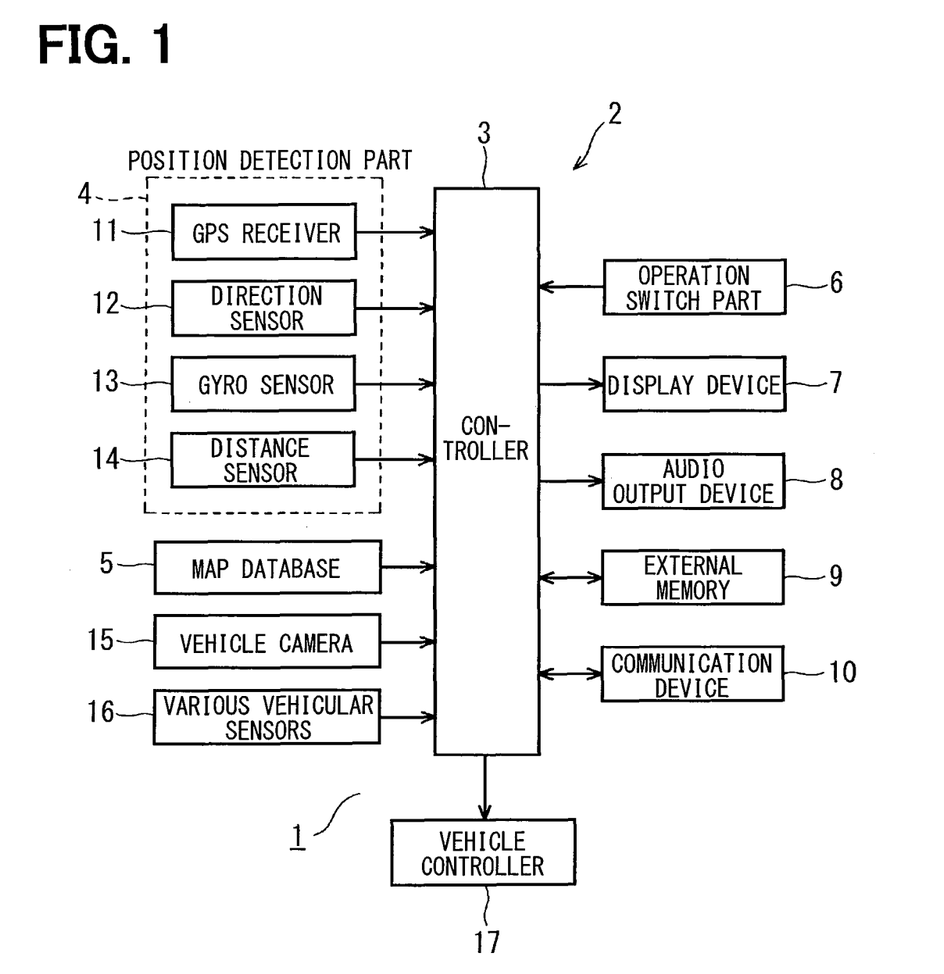
FIG. 1 is a block diagram as an embodiment of the present disclosure, schematically illustrating hardware configuration of a drive assist system.
Figure 2:
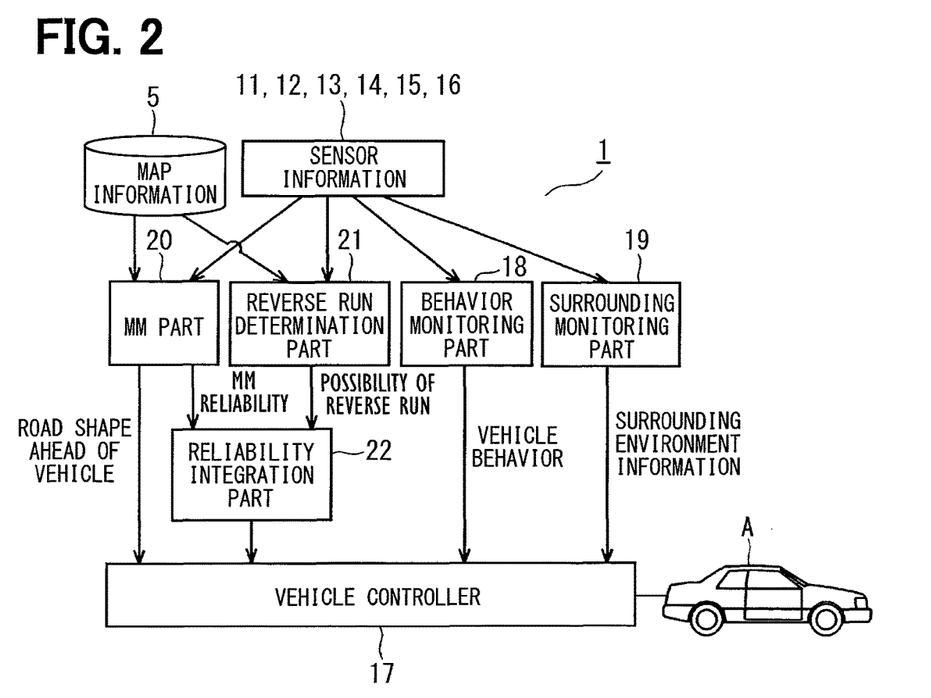
FIG. 2 is a functional block diagram schematically showing the configuration of the drive assist system.

Hereinbelow, an embodiment of implementation of the present disclosure will be described with reference to FIGS. 1 to 4. FIG. 1 schematically shows a hardware configuration of a vehicle drive support system 1 according to the present embodiment incorporated in a vehicle A (see FIG. 2). In the present embodiment, the drive support system 1 is configured as a system including a car navigation device 2. Further, FIG. 2 is a functional block diagram schematically showing a structure related to implementation of drive assist processing (drive assist method according to the present embodiment) of the drive support system 1.

As shown in FIG. 1, the car navigation device 2 has a controller (navigation ECU) 3, and has a position detection part 4, a map database 5, an operation switch part 6, a display device 7, an audio output device 8, an external memory 9, and a communication device 10 connected to the controller 3. The controller 3 is configured with a computer as a main body having a CPU, a ROM and a RAM. It controls the entire car navigation device 2 in accordance with a program stored in the ROM.

The position detection part 4 has a GPS receiver 11 to receive a transmission radio wave from a GPS (Global Positioning System) satellite for vehicle position measurement by radio navigation. In addition to the receiver, the position detection part 4 includes a direction sensor 12 to detect a direction of the vehicle A, a gyro sensor 13 to detect a turning angle of the vehicle A, and a distance sensor 14 to detect a travel distance of the vehicle A, for vehicle position estimation by self-contained navigation. The controller 3 detects a current position (absolute position), a traveling direction, a speed, a travel distance, and current time of the own vehicle, based on inputs from the respective sensors 11 to 14 forming the position detection part 4. With these elements, a position detection device is configured.

The map database 5 holds e.g. road map data on whole extent of Japan, destination data on various facilities and shops accompanying the road map data, and data for map matching. It functions as a map data acquisition device. The road map data has a road network expressing roads on the map as lines. The line is divided into a plurality of parts i.e. intersections, branching points as nodes, and the connection among respective nodes are defined as links, thus it is given as link data. The link data includes a link ID (identifier) unique to the link, a link length, position data (latitude and longitude) on start point and end point of the link (node), angular (directional) data, and data on a road width, a road type and a road attribute. Note that data to reproduce (draw) the road map on the screen of a display device 7 is also included.

The operation switch part 6 includes mechanical switches arranged on the periphery of a touch panel provided on the screen of the display device 7. The display device 7 is configured with e.g. a liquid crystal display capable of color display, and it is provided e.g. at the central portion of an instrumental panel in a vehicle room. For example, a menu screen or a map screen upon use of navigation function is displayed on the screen of the display device 7. The audio output device 8 includes a speaker, and it outputs music and audio guidance. The communication device 10 performs data transmission/reception with an external information center via e.g. the Internet.

With this arrangement, the navigation device 2 (controller 3) performs navigation processing for, as is generally known, a location function of displaying a detected position of the own vehicle A with a road map on the screen of the display device 7, and a route guidance function of searching an appropriate route to a destination designated by a user and guiding the route. At this time, as described later, upon execution of the location function, to display the position of the own vehicle A on a road on the displayed electronic map, map matching processing of comparing a movement trajectory of the own vehicle A with a road shape in the road map data in consideration of error, and estimating a road where the vehicle is currently traveling, is performed. Further, the route search is performed by e.g. generally-known Dijkstra method. The route guidance is performed by, as is generally known, with the screen display on the display device 7, outputting necessary voice guidance with the audio output device 8.

As shown in FIG. 1, the drive support system 1 has a vehicle camera 15, various vehicular sensors 16, and a vehicle controller 17, connected to the controller 3 via unshown CAN (Car Area Network). The vehicle camera 15 performs image pickup to acquire e.g. an image ahead of the vehicle A, performs image pickup on other vehicles and obstacles, road indication and road traffic signs on the road ahead of the vehicle. Then, acquisition of surrounding environment information and determination of reverse run possibility to be described later are performed based on image recognition processing on the acquired images.

Although not shown in detail, the various vehicular sensors 16 include other various vehicular sensors to detect the behavior of the vehicle A. For example, a speed sensor to detect the speed of the vehicle A, an acceleration sensor to detect acceleration of the vehicle A in longitudinal and/or lateral direction, a wheel speed sensor to detect a rotation speed of the wheels, a steering sensor to detect a steering rotational angle (rotation speed), an accelerator sensor to detect an operation amount of an accelerator, a brake sensor to detect an operation amount of a brake, a winker sensor to detect the operation of the left and right turn signal lamps, and an angular velocity sensor to detect an angular velocity accompanying the turning of the vehicle A.

The vehicle controller 17 includes a computer. It performs map-based ADAS to assist driver's operation by controlling the control subjects in the vehicle A such as the accelerator, the brake, and the steering, based on the determined position of the own vehicle A determined by the map matching processing, the map data, and monitor information from a behavior monitoring part 18 and a surrounding monitoring part 19 (see FIG. 2) to be described later. Accordingly, the vehicle controller 17 functions as an assist device. At this time, as described later in detail, the vehicle controller 17 compares the reliability of map matching with a threshold value. With the reliability equal to or higher than the threshold value as a condition, it performs the vehicle control (drive assist) operation (when the reliability is lower than the threshold value, it does not perform the vehicle control).

As shown in FIG. 2, the controller 3 performs functions as a map matching part 20, a reverse run determination part 21, a reliability integration part 22, the behavior monitoring part 18, and the surrounding monitoring part 19, mainly with its software configuration. Among them, the behavior monitoring part 18 monitors the behavior of the own vehicle A from detection signals from the respective sensors 11 to 14 of the position detection part 4 and further detection signals from the vehicle camera 15 and the various vehicular sensors 16. It outputs monitoring information necessary for vehicle control to the vehicle controller 17. Further, the surrounding monitoring part 19 monitors the surroundings of the own vehicle A (situations of other vehicles) from these sensor information and map data. It outputs surrounding environment information necessary for vehicle control to the vehicle controller 17.

The map matching part 20 performs generally-known map matching processing based on the position of the own vehicle A detected with the position detection part 4 and the map data. Then it determines (corrects) the position of the own vehicle A on the road. In addition, the map matching part 20 calculates reliability indicating the reliability of the map matching processing. These map matching processing and calculation of reliability are repeated continuously at predetermined time intervals. Accordingly, the map matching part 20 has functions as a map matching device and a reliability calculation device.

Here the outline of the map matching processing and the reliability calculation processing performed with the map matching part 20 will be briefly described. That is, in the map matching processing, first, a travel trajectory of the own vehicle A is obtained based on the position (absolute position and traveling direction) detected with the position detection part 4 (radio navigation and self-contained navigation). Next, it searches for roads within a predetermined range (error range), with the detected position of the own vehicle A as a center, from the map data, and selects candidate roads. Note that the search for candidate roads is performed on the assumption that the own vehicle A travels in compliance with the laws and regulations. A road where the detected direction of the own vehicle A is inconsistent with a predetermined traveling direction is excluded from the candidates.

Next, the shapes of the selected candidate roads are compared with the travel trajectory, then the level of similarity (correlation) is digitalized. A candidate road having the highest similarity is determined as a road on which the own vehicle A is traveling. Then the position and the direction of the own vehicle are determined (the position detected with the position detection part 4 is corrected). The determined position (position and direction) as a result of this map matching processing is outputted to the vehicle controller 16. Further, as described above, the result of map matching is used in execution of the location function of the car navigation device 2.

Next, the calculation of the reliability of map matching processing is performed based on e.g. execution of the following pieces of determination processing. That is, sensor status determination processing to determine whether or not the respective sensors 12 to 14 of the position detection part 4 normally operate, measuring status determination processing to determine the status of measurement with the GPS receiver 11, sensor accuracy determination processing to determine the accuracy of the respective sensors 12 to 14, positional shift determination processing to determine positional shift between the detected traveling direction of the vehicle A and the direction of road link, error range determination processing to determine a detection error regarding the direction of the own vehicle A, shape correlation determination processing to determine the shape correlation between the travel trajectory of the own vehicle A and the map data, number of candidates determination processing to determine the number of candidate roads, and continuity determination processing to determine the amount of displacement from the detected position in the result of map matching processing, are performed. Thereafter, the reliability is obtained by weighting the determination results of the respective processing and adding them. The calculation result of the reliability is outputted to the reliability integration part 22.

On the other hand, the reverse run determination part 21 determines the presence/absence of possibility that the own vehicle A reverse-way travels a road where the traveling direction is fixed to one direction, from respective sensor information from the respective sensors 11 to 14 of the position detection part 4, further, the vehicle camera 15 and the various vehicular sensors 16, and the map data of the map database 5. The presence/absence of determination of possibility of reverse run is repeated at predetermined time intervals. The reverse run determination part 21 functions as a determination device. In this case, the presence/absence of possibility of reverse run is determined without using the determined position of the own vehicle A obtained with the map matching part 20 (map matching result).

In the present embodiment, the determination of reverse run is performed by e.g. a plurality of methods as follows. That is, when the reverse run determination part 21 determines, based on the position detected with the position detection part 4, that the own vehicle A traveling an expressway has entered a service area or a parking area through an approach way, and thereafter, returned to, not an exit way but the entry way, it determines that there is a possibility of reverse run. Further, when the reverse run determination part 21 determines, based on the respective sensor information from the respective sensors 11 to 14 of the position detection part 4, the vehicle camera 15 and the various vehicular sensors 16, that the own vehicle A traveling the expressway (or in a position which is not an intersection of a road with a plurality of lanes each way) has performed U-turn traveling, it determines that there is a possibility of reverse run.

Further, when a road where the traveling direction is fixed to one direction exists around the own vehicle A, based on the position detected with the position detection part 4, the reverse run determination part 21 determines, based on an image ahead of the vehicle acquired with the vehicle camera 15, the presence/absence of possibility of reverse run. More particularly, in a case where a no-entry (or one way) road traffic sign has been image-picked up with the vehicle camera 15 but it is determined that the vehicle is traveling in an opposite direction; in a case where all the road traffic signs image-picked up with the vehicle camera 15 are faced to the opposite side (face backward); in a case where a large number of oncoming vehicles (in a status where other vehicles are approaching from the front direction) are image-picked up although the vehicle is traveling a one-way road, it is determined that there is a possibility of reverse run.

Then, when the reverse run determination part 21 determines that there is a possibility of reverse run of the own vehicle A, it outputs the result of determination to the reliability integration part 22. As described in the next explanation of operation, the reliability integration part 22 generally outputs the reliability from the map matching part 20 to the vehicle controller 17 without any change. However, when it receives the result of determination indicating the presence of possibility of reverse run from the reverse run determination part 21, forcibly reduces a numerical value of the reliability to a value less than a threshold value, and outputs the value to the vehicle controller 17. As described above, when the reliability as a result of map matching is less than the threshold value, the vehicle controller 17 does not perform vehicle control. Accordingly, a cancel device is configured with the reliability integration part 22 and the vehicle controller 17.

Next, the operation of the configuration will be described with reference to FIGS. 3 and 4. In the vehicle A, the detection of the position of the own vehicle A (map matching processing) is always performed. Along with this processing, the vehicle controller 17 performs drive assist control in accordance with necessity. As a particular example, in this drive assist, approach of a curve is predicted by looking ahead the road map shape ahead of the vehicle A in the traveling direction, and pushing back an accelerator pedal (brake) when the speed is excessive with respect to the curvature of the curve, to call the driver's attention (see FIG. 5A).

Further, although not shown, when there is a possibility that the vehicle A protrudes to the left (road shoulder side) from the lane where the vehicle is currently traveling, the drive assist is performed to forcibly operate the steering to the opposite side (to return to the traffic lane). Further, when a curve ahead of the vehicle is detected, the drive assist is performed to control the steering in correspondence with the curvature of the curve. Furthermore, when there is an obstacle (preceding vehicle) ahead of the vehicle, the drive assist is performed to forcibly actuate the brake to avoid collision (bump from behind).

Upon execution of drive assist control with the vehicle controller 17, the following respective steps are performed with the controller 3. That is, a position detection step to detect the position of the own vehicle A is performed based on the detection signals from the respective sensors 11 to 14 of the position detection part 4. At the same time, a map data acquisition step to read map data in the vicinity of the own vehicle A from the map database 5 is performed.

Further, in the map matching part 20, a map matching step to determine the position of the own vehicle A on the road by map matching processing is performed based on the position detected at the position detection step and the map data. At the same time, in the map matching part 20, a calculation step to calculate the reliability of the result of map matching is performed. Then, an assist step to assist the driver's operation is performed with the vehicle controller 17, using the position of the own vehicle A determined at the map matching step and the road shape ahead of the vehicle in the traveling direction indicated in the map data, the monitoring information from the behavior monitoring part 18, and the surrounding environment information from the surrounding monitoring part 19.

On the other hand, in the reverse run determination part 21, in parallel with the map matching step in the map matching part 20, a determination step to determine the presence/absence of possibility of reverse run of the own vehicle A is always performed. At this determination step, when it is determined that there is a possibility of reverse run of the own vehicle A, a cancel step to stop the drive assist with the vehicle controller 17 is performed as follows.

That is, as described above, the reverse run determination part 21 determines the presence/absence of possibility that the own vehicle A reverse-way travels a road where the traveling direction is fixed to one direction, from the position detected in the position detection part 4 and further, the respective sensor information from the vehicle camera 15 and the various vehicular sensors 16, and the map data from the map database 5. When it determines that there is a possibility of reverse run, it outputs the result of determination indicating the presence of possibility of reverse run to the reliability integration part 22. The reliability integration part 22 inputs the data on the reliability of map matching from the map matching part 20. When it inputs a signal indicating that there is a possibility of reverse run from the reverse run determination part 21, it forcibly reduces the numerical value of the reliability to a value less than the threshold value and outputs the value to the vehicle controller 17.

Figure 3:
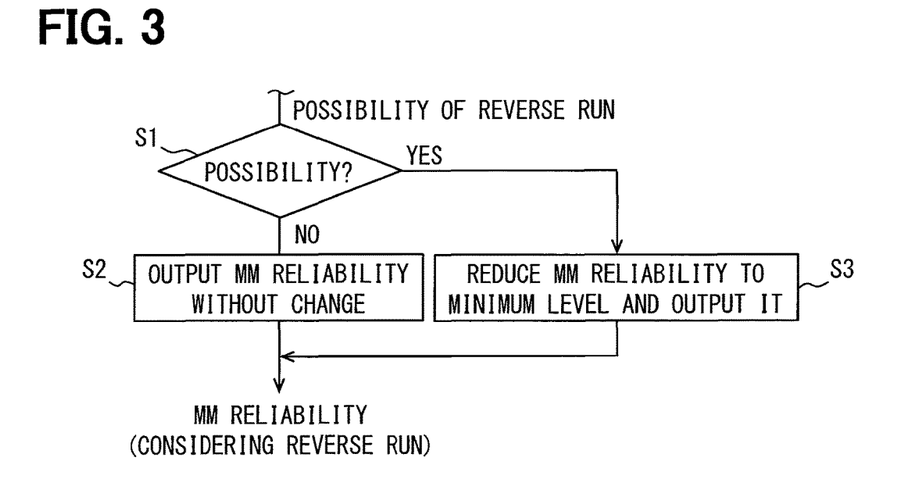
FIG. 3 is a flowchart showing a processing procedure in a reliability integration part.

The flowchart of FIG. 3 shows a processing procedure in the reliability integration part 22. At step S1, it is determined whether or not a signal indicating that there is a possibility of reverse run has been inputted. When the signal indicating that there is a possibility of reverse run has not been inputted (No at step S1), the reliability is outputted to the vehicle controller 17 without any change at the next step S2. On the other hand, when a signal indicating that there is a possibility of reverse run has been inputted (Yes at step S1), the reliability inputted from the map matching part 20 is reduced to a minimum level, and the reliability is outputted to the vehicle controller 17 at step S3. The vehicle controller 17 compares the inputted reliability of map matching with the threshold value. When the reliability is equal to or greater than the threshold value, it performs the vehicle control. When the reliability is less than the threshold value, it determines to cancel execution of the vehicle control.

Figure 4:
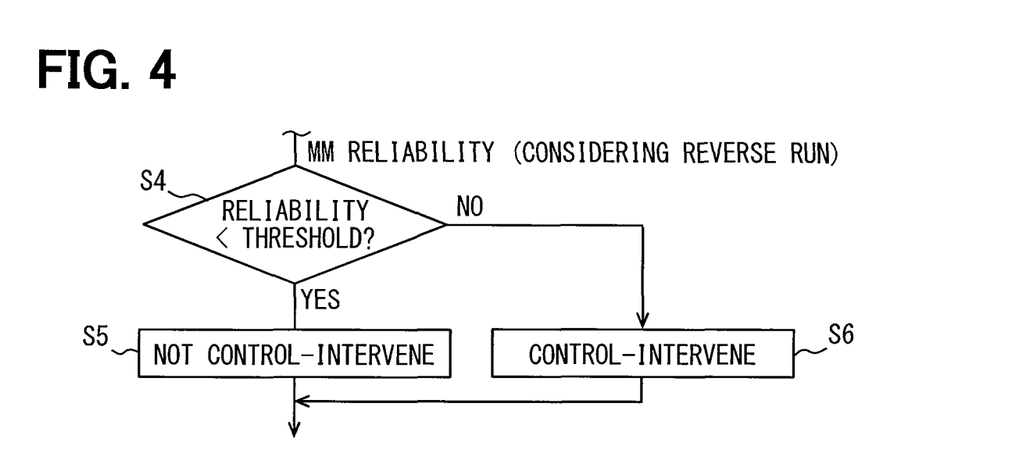
FIG. 4 is a flowchart showing a procedure of determination processing as to possibility/impossibility of execution of control in a vehicle controller.

The flowchart of FIG. 4 shows a processing procedure of determination as to whether or not the vehicle control is to be performed with the vehicle controller 17. That is, at step S4, it is determined whether or not the numerical value of the reliability inputted from the reliability integration part 22 is less than the threshold value. When the reliability is less than the threshold value (Yes at step S4), a determination not to perform vehicle control (intervene), i.e., to stop the drive assist, is made at step S5. On the other hand, when the reliability is equal to or greater than the threshold value (No at step S4), a determination to perform the vehicle control (intervene) is made at step S6.

In this arrangement, the vehicle controller 17 performs assist of the driver's operation using the position of the own vehicle A determined with the map matching part 20 and the road shape ahead of the vehicle in the traveling direction indicated in the map data. At this time, the reverse run determination part 21 determines the presence/absence of possibility that the own vehicle reverse-way travels a road where the traveling direction is fixed to one direction. When it determines that there is a possibility of reverse run, the drive assist with the vehicle controller 17 is canceled based on the reduction of the reliability of map matching to the minimum level with the reliability integration part 22.

Accordingly, as shown in FIG. 5B described in the conventional art, in some cases, the vehicle A reverse-way travels in the arrow b direction on the road R1 in a road shape where the one-way road R1 in the arrow W1 direction and the one-way road R2 in the opposite arrow W2 direction are adjacent. At this time, in the map matching processing, even when it is determined that the vehicle B travels in the arrow c direction as a regular direction on the road R2, the reverse run determination part 21 determines that there is a possibility of reverse run in the present embodiment. Accordingly, the vehicle control (drive assist) with the vehicle controller 17 is cancelled. This prevents execution of inappropriate vehicle control.

Note that when the reverse run determination part 21 determines the possibility of reverse run of the own vehicle A but thereafter the possibility of reverse run is dissolved, the reliability is returned to the numerical value calculated with the map matching part 20. As a result, execution of the vehicle control with the vehicle controller 17 is permitted (restarted). It may be arranged such that when the reverse run determination part 21 determines the reverse run of the own vehicle A, a reverse run warning message to the driver is displayed on the display device 7, or outputted with the audio output device 8 as a voice message.

In the drive support system 1 and drive support method according to the present embodiment, drive support is performed based on the position of own vehicle determined by the map matching processing. When the reverse run determination part 21 determines that there is a possibility that the own vehicle A reverse-way travels, the reliability integration part 22 reduces the reliability inputted from the map matching part 20 to the minimum level. Then the vehicle controller 17 cancels the vehicle control (drive assist). As a result, according to the present embodiment, an excellent effect that it is possible to prevent inappropriate assist control due to reverse run of the own vehicle A on the road.

Note that in the embodiment, as a device to cancel the vehicle control with the vehicle controller 17 when there is a possibility of reverse run, the reliability of map matching is utilized. Further, it may be arranged such that a cancel signal is directly outputted to the vehicle controller 17 to cancel the control. Further, in the embodiment, as vehicle control (drive assist), the accelerator, the brake, and steering are controlled. In addition, as a subject of vehicle control based on look-ahead of road shape, various controls may be performed such as control of automatic transmission, control of an optical axis of a light (headlamp), control of a car air conditioner, control of a mirror, and control of a drive source in a hybrid vehicle.

Further, regarding particular method of map matching processing, the reliability calculation method, and the reverse run determination method, generally-known various methods may be employed. Further, regarding the hardware configuration of the drive support system 1 including the car navigation device 2, various modifications are possible. The present disclosure is not limited to the one embodiment described above and shown in the drawings, but may be appropriately changed and implemented within a range not departing from its subject matter.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicle drive assist system executed on a controller, the system comprising:
   a position detection device that detects a position of a vehicle based on a detection signal from at least one of a plurality of vehicular sensors;
   a map data acquisition device that acquires map data;
   a map matching device that determines the position of the vehicle on a road by map matching processing based on a detected position detected by the position detection device and the map data;
   an assist device that assists a driver's operation based on a determined position of the vehicle determined by the map matching device and a road shape ahead of the vehicle in a traveling direction indicated on the map data;

a determination device that determines a probability that the vehicle travels a wrong way on a road where the traveling direction is fixed to one way; and a cancel device that cancels drive assist executed by the assist device when the determination device determines that a probability of reverse run exists, wherein:

the map matching device has a reliability calculation device that estimates reliability of the determined position of the vehicle determined by the map matching device;

the assist device performs the drive assist when the reliability is equal to or greater than a threshold value; and the cancel device forcibly reduces a numerical value of the reliability to be less than the threshold value when the determination device determines that the probability of reverse run exists.

2. The vehicle drive assist system according to claim 1, wherein:

after the cancel device cancels the drive assist, when the determination device determines that the probability of reverse run of the vehicle does not exist, cancellation of the cancel device is dissolved, and the assist device restarts the drive assist.

3. The vehicle drive assist system according to claim 1, wherein:

the determination device determines based on the detected position detected by the position detection device whether the vehicle has entered a service area or a parking area through an entry way while traveling on an expressway; and after the determination device determines that the vehicle has entered the service area or the parking area, when the determination device determines that the vehicle has returned to the entry way, the determination device determines that the probability of reverse run exists.

4. The vehicle drive assist system according to claim 1, wherein:

the determination device determines that the probability of reverse run exists when the determination device determines based on the detection signals from the vehicular sensors that the vehicle has made a U-turn while traveling on an expressway.

5. The vehicle drive assist system according to claim 1, further comprising:

a vehicle camera that shoots surroundings of the vehicle, wherein the determination device determines the probability of reverse run based on an image acquired with the vehicle camera when it is determined based on the detected position detected by the position detection device that a road exists around the vehicle where the traveling direction is fixed to one way.

6. The vehicle drive assist system according to 1, wherein:

the assist device assists the driver's operation to promote an attention of the driver by predicting approach of a curve based on the road shape ahead of the vehicle in the traveling direction, and by pushing back an accelerator pedal when a speed is excessive.

7. The vehicle drive assist system according to claim 1, wherein:

when a probability exists that the vehicle runs off a traffic lane, where the vehicle is travelling currently, to a road shoulder side, the assist device assists the driver's operation by forcibly operating a steering wheel to return to the traffic lane.

8. The vehicle drive assist system according to claim 1, wherein:

when an obstacle or a preceding vehicle is disposed ahead of the vehicle, the assist device assist the driver's operation by forcibly actuating a brake to avoid a collision.

9. A drive assist implementation method in a vehicle having an assist device that assists a driver's operation executed on a controller, the method comprising:

detecting a position of the vehicle based on a detection signal from at least one of a plurality of vehicular sensors;

acquiring map data;

determining the position of the vehicle on a road by map matching processing based on a detected position and the map data;

assisting the driver's operation with the assist device based on a determined position of the vehicle and a road shape ahead of the vehicle in a traveling direction indicated on the map data;

determining a probability that the vehicle travels a wrong way on a road where the traveling direction is fixed to one way; and cancelling the drive assist executed by the assist device when it is determined that a probability of reverse run exists, wherein:

the determining of the position includes estimating reliability of the determined position of the vehicle;

the assisting of the driver's operation includes performing the drive assist when the reliability is equal to or greater than a threshold value; and the cancelling of the drive assist includes forcibly reducing a numerical value of the reliability to be less than the threshold value when it is determined in the determining of the probability that the probability of reverse run exists.

* * * * *